US008821337B2

(12) United States Patent
Phillips

(10) Patent No.: US 8,821,337 B2
(45) Date of Patent: Sep. 2, 2014

(54) CLUTCH ASSEMBLY

(75) Inventor: Andrew W. Phillips, Rochester, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 699 days.

(21) Appl. No.: 12/784,645

(22) Filed: May 21, 2010

(65) Prior Publication Data

US 2011/0287886 A1    Nov. 24, 2011

(51) Int. Cl.
*F16H 3/44* (2006.01)
*F16D 47/04* (2006.01)
*F16H 3/66* (2006.01)

(52) U.S. Cl.
CPC ........ *F16D 47/04* (2013.01); *F16H 2200/2041* (2013.01); *F16H 2200/2023* (2013.01); *F16H 2200/2007* (2013.01); *F16H 3/663* (2013.01); *F16H 2200/0047* (2013.01); *F16H 2200/2043* (2013.01)
USPC ........................................................ 475/295

(58) Field of Classification Search
USPC ......... 475/281, 283, 285, 287, 289, 291, 292, 475/297, 307, 312, 318, 324
See application file for complete search history.

(56) References Cited

U.S. PATENT DOCUMENTS

| 6,290,044 | B1 | 9/2001 | Burgman et al. | |
|---|---|---|---|---|
| 8,029,403 | B2 * | 10/2011 | Lee et al. | 475/276 |
| 8,177,677 | B2 * | 5/2012 | Samie et al. | 475/324 |
| 8,267,231 | B2 | 9/2012 | Holmes | |
| 2005/0113205 | A1 | 5/2005 | Oguri et al. | |
| 2010/0204002 | A1* | 8/2010 | Borgerson | 475/292 |
| 2011/0015029 | A1 | 1/2011 | Phillips et al. | |

* cited by examiner

*Primary Examiner* — Saul Rodriguez
*Assistant Examiner* — David J Hlavka

(57) ABSTRACT

A clutch assembly for transmitting a first torque between a first member and a second member includes a first clutch and a one-way clutch assembly. The first clutch has at least one first clutch element rotatably coupled to the first member and at least one second clutch element rotatably coupled to the second member. The one-way clutch assembly is disposed in parallel with the first clutch between the first member and the second member. When the one-way clutch assembly is actuated torque is transmitted between the first member and the second member in a first rotational direction and the one-way clutch assembly does not transmit torque between the first member and the second member in a second rotational direction. When the one-way clutch assembly is not actuated then the one-way clutch assembly does not transmit torque in the first rotational direction or the second rotational direction.

16 Claims, 1 Drawing Sheet

CLUTCH ASSEMBLY

TECHNICAL FIELD

The present disclosure relates to clutch assemblies, and more particularly to clutch assemblies that include one-way clutches in parallel with friction clutches.

BACKGROUND

The statements in this section merely provide background information related to the present disclosure and may or may not constitute prior art.

Automatic transmissions provide a plurality of forward and reverse speed or gear ratios by selectively actuating one or more brakes or clutches. One type of brake or clutch useful in automatic transmissions is known as a one-way clutch. A one-way clutch includes a "locked" mode in one rotational direction and a "freewheel" mode in the opposite rotational direction. Some existing transmissions use a passive one-way clutch deployed in parallel with a plate clutch that is generally actuated in a first gear ratio and not actuated in a second gear ratio. Some transmission designs, however, are not compatible with these passive one-way clutch configurations because the members must be able to rotate with respect to each other in the direction not allowed by the passive one-way clutch while in certain gear ratios. One solution is to use a plate clutch instead of the one-way clutch configuration. The plate clutch, however, does not allow "freewheeling," or rotation in the direction opposite the direction of torque transfer, and takes up more space and causes more rotational energy loss than a one-way clutch for a predetermined clutch torque limit. The freewheeling capability is useful for avoiding unintended engine braking in the first gear ratio and for simplifying shifts into and out of the first gear ratio.

Thus, there is a need for a new and improved clutch assembly that provides beneficial operating modes while minimizing increases in mass, cost, and inefficiencies.

SUMMARY

A clutch assembly for transmitting a first torque between a first member and a second member includes a first clutch and a selectably enabled one-way clutch assembly. The first clutch has at least one first clutch element rotatably coupled to the first member and at least one second clutch element rotatably coupled to the second member. The one-way clutch assembly is disposed in parallel with the first clutch between the first member and the second member. When the one-way clutch assembly is actuated, it can transmit torque between the first member and the second member in a first rotational direction, but not in a second rotational direction. When the one-way clutch assembly is not actuated, the one-way clutch assembly does not transmit torque in either the first rotational direction or the second rotational direction.

In another example of the present invention, the first clutch is a friction clutch.

In yet another example of the present invention, the one-way clutch assembly includes a selectable one-way clutch having a first race rotatably coupled to the first member and a second race rotatably coupled to the second member.

In yet another example of the present invention, the first member is a first member of a planetary gear set and the second member is a second member of a planetary gear set.

In yet another example of the present invention, the first member is a carrier member of a planetary gear set of a vehicle transmission and the second member is a sun gear of a planetary gear set of the vehicle transmission.

In yet another example of the present invention, the one-way clutch assembly is actuatable to transmit torque in a first gear ratio of a vehicle transmission.

In yet another example of the present invention, the first clutch has a torque rating that is less than a torque transmitted between the first member and the second member in a first gear ratio of the vehicle transmission.

In yet another example of the present invention, the first clutch is actuatable by a hydraulic fluid and the one-way clutch assembly is actuatable by a hydraulic fluid.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
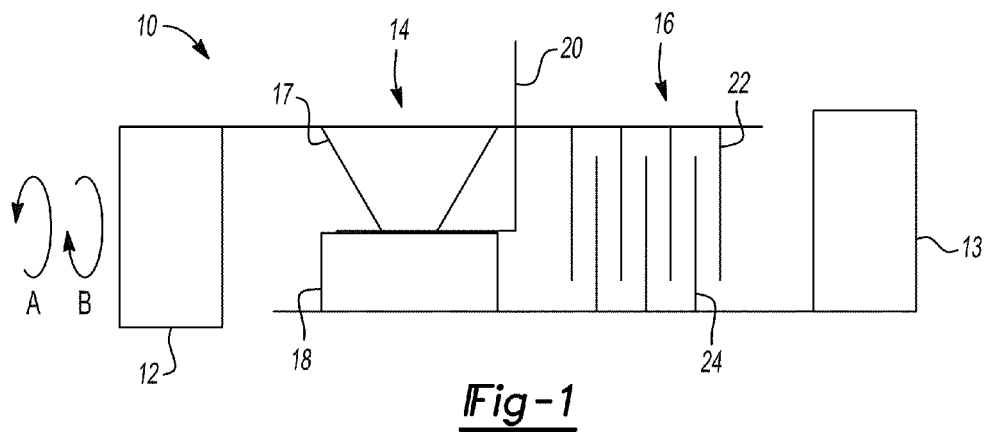
FIG. 1 is a block diagram of an exemplary clutch assembly according to the principles of the present invention.

Referring to the drawings, wherein like reference numbers refer to like components, in FIG. 1 a schematic view of a clutch assembly 10 is illustrated, in accordance with an embodiment of the present invention. The clutch assembly 10 is disposed in a transmission of an automobile. The transmission generally includes a plurality of gear sets, a plurality of shafts, and a plurality of torque transmitting mechanisms. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission may vary without departing from the scope of the present disclosure.

The clutch assembly 10 is one of the plurality of torque transmitting mechanisms and either transmits torque or allows rotation between a first member 12 and a second member 13 depending on the operating condition of the clutch assembly 10, as will be described below. The first member 12 and the second member 13 are generally cylindrical or annular in shape. However, the first member 12 and the second member 13 may be other types of driven gears, shafts, or members disposed in other environments. The clutch assembly 10 includes a selectable one-way clutch 14 (SOWC 14) and a friction clutch 16 each connected between the first member 12 and the second member 13.

The SOWC 14 includes a first race 17 that opposes a second race 18. The first race 17 is rotatably coupled to the first member 12 and the second race 18 is rotatably coupled to the second member 13. In the example provided, the SOWC 14 always allows the first race 17 to rotate or "slip" relative to the second race 18 in a first direction A, but selectively prevents relative motion in the opposite sense. In the example provided, the SOWC 14 is a mechanical diode one-way clutch. However, the SOWC 14 may be other types of selectable one way clutches without departing from the scope of the present invention. For example, the SOWC 14 may be similar to a clutch described in U.S. Pat. No. 6,290,044, which is hereby incorporated by reference. In the example provided, the SOWC 14 is actuated by a selector plate 20 that is rotatable by a hydraulic fluid in the transmission.

The friction clutch 16 includes at least one first friction element 22 that is rotatably coupled to the first member 12 and at least one second friction element 24 that is rotatably coupled to the second member 13. The size, materials, and number of elements 22, 24 determine a torque rating of the friction clutch 16. The torque rating is the amount of torque the friction clutch 16 will transmit before the elements 22, 24 start to rotate with respect to each other, or slip. In the example provided, the torque rating is predetermined to provide driving torque in certain gear ratios and be less than that required for other gear ratios to save space. For example, in the transmission shown in the figures, the SOWC 14 is used to provide driving torque in a higher torque first gear ratio and the friction clutch 16 is used to provide driving torque in lower torque third gear ratio and fifth gear ratio. Preferably the clutch assembly 10 is used with electronic throttle controls to reduce the chances of the friction clutch 16 experiencing torque higher than the torque rating when shifting into the first gear ratio, such as when changing the operating mode of the transmission from Neutral or Reverse into Drive. Preferably, the friction clutch 16 is applied by a hydraulically actuated cylinder; however the friction clutch 16 may be actuated by other means without departing from the scope of the present invention.

During operation of the clutch assembly 10, the first member 12 and the second member 13 may rotate at different speeds. When the clutches 14, 16 are not actuated, the members 12, 13 freely rotate with respect to each other in the first direction A and the second direction B. When the SOWC 14 is actuated and the friction clutch 16 is not actuated, the SOWC 14 allows free rotation of the first member 12 in the first direction A with respect to the second member 13 and transmits torque from the first member 12 to the second member 13 in the second direction B. When the friction clutch 16 is actuated and the SOWC 14 is not actuated, the friction clutch 16 transmits up to the torque rating in either direction between the members 12, 13. It should be appreciated that although the operation is described as transmitting torque from the first member 12 to the second member 13 in one of the directions A, B, the torque may also be transmitted from the second member 13 to the first member 12 when the relative rotations are as described.

Figure 2:
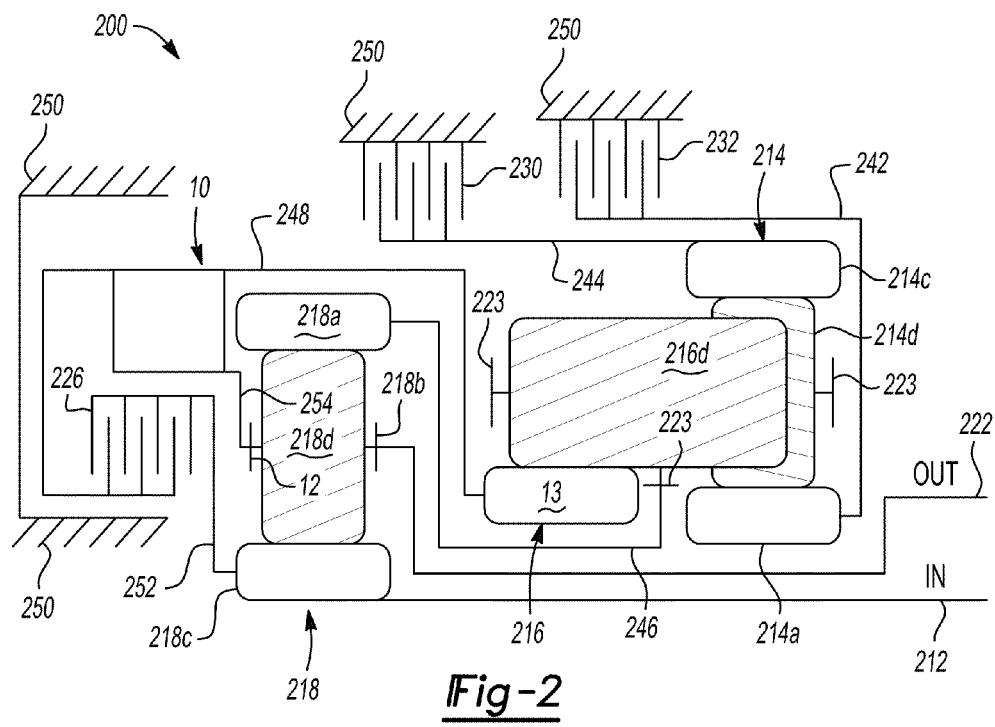
FIG. 2 is a diagram of a transmission employing the clutch assembly according to the principles of the present invention.

Referring now to FIG. 2, a stick diagram presents a schematic layout of a five speed transmission 200 incorporating the clutch assembly 10 according to an embodiment of the present invention. The five speed transmission 200 relates to a transmission described in U.S. Patent Application No. 61/226,265 filed on Jul. 16, 2009, which is hereby incorporated by reference. The transmission 200 includes an input member 212, a first planetary gear set 214, a second planetary gear set 216, a third planetary gear set 218, and an output member 222.

The planetary gear set 214 includes a sun gear member 214A, a ring gear member 214C, and a planet gear carrier member 223. The planetary carrier 223 is common to planetary gear set 214 and planetary gear set 216. Planetary carrier 223 rotatably supports a first set of planet gears 214D (only one of which is shown) and a second set of planet gears 216D (only one of which is shown). The sun gear member 214A is connected for common rotation with a first shaft or interconnecting member 242. The ring gear member 214C is connected for common rotation with a second shaft or interconnecting member 244. Planetary carrier 223 is connected for common rotation with a third shaft or interconnecting member 246. The first set of planet gears 214D are each configured to intermesh with both the sun gear member 214A, the ring gear member 214C and the second set of planet gears 216D.

The planetary gear set 216 includes the second member or sun gear member 13 and the planet gear carrier member 223 as described above. Planetary carrier 223 rotatably supports the first set of planet gears 214D (only one of which is shown) and the second set of planet gears 216D (only one of which is shown). The sun gear member 13 is connected for common rotation with a fourth shaft or interconnecting member 248. The planet carrier member 223 is connected for common rotation with the third shaft or interconnecting member 246. The first set of planet gears 214D are each configured to intermesh with both the sun gear member 214A, the ring gear member 214C and the second set of planet gears 216D. The second set of planet gears 216D are each configured to also intermesh with the sun gear 13. The transmission 200 does not include a ring gear in planetary gear set 216. Instead, the planetary gear set 216 "uses," effectively, the ring gear 214C of the first planetary gear set 214 through the meshing relationship of first and second sets of planet gears 214D and 216D, sun gear 13 and ring gear 214C.

The planetary gear set 218 includes a sun gear member 218C, a ring gear member 218A and the second member or planet gear carrier member 12 that rotatably supports a set of planet gears 218D (only one of which is shown). The sun gear member 218C is connected for common rotation with a fifth shaft or interconnecting member 252 and with the input member or shaft 212. The ring gear member 218A is connected for common rotation with the third shaft or interconnecting member 246. The planet carrier member 12 is connected for common rotation with a sixth shaft or interconnecting member 254 and with output member or shaft 222. The planet gears 218D are each configured to intermesh with both the sun gear member 218C and the ring gear member 218A.

The input shaft or member 212 is continuously connected to an engine (not shown) or to a turbine of a torque converter (not shown). The output shaft or member 222 is continuously connected with the final drive unit or transfer case (not shown).

Torque-transmitting mechanisms or clutches 10, 226 and brakes 230 and 232 allow for selective interconnection of the shafts or interconnecting members, members of the planetary gear sets, and the housing. For example, the first clutch 226 is selectively engageable to connect the fourth shaft or interconnecting member 248 with the fifth shaft or interconnecting member 252. The clutch assembly 10 is selectively engageable to transmit torque between the interconnecting member 248 and the sixth shaft or interconnecting member 254. The first brake 230 is selectively engageable to connect the second shaft or interconnecting member 244 with a stationary element or a transmission housing 250 in order to restrict the member 244 from rotating relative to the transmission housing 250. The second brake 232 is selectively engageable to connect the first shaft or interconnecting member 242 with the stationary element or the transmission housing 250 in order to restrict the member 242 from rotating relative to the transmission housing 250.

Referring now to FIG. 1 and FIG. 2, the operation of the transmission 200 will be described. It will be appreciated that transmission 200 is capable of transmitting torque from the input shaft or member 212 to the output shaft or member 222 in at least five forward speed or torque ratios and at least one reverse speed or torque ratio. Each forward and reverse speed or torque ratio is attained by engagement of one or more of the torque-transmitting mechanisms (i.e. first clutch 226, clutch assembly 10, first brake 230 and second brake 232). In different gear ratios the sun gear member 13 and the planet gear carrier member 12 may move or transmit torque in either rotational direction relative to each other depending on the operating condition of the clutch assembly 10. For example, the first member 12 and the second member 13 rotate relative to each other in different rotational directions depending on whether the transmission 200 is in a reverse gear ratio, a second gear ratio, or a fourth gear ratio. Similarly, the clutch assembly 10 transmits torque in different rotational directions depending on whether the transmission 200 is in a first gear ratio, a third gear ratio, or a fifth gear ratio.

The friction clutch 16 may be actuated to achieve synchronization of the first member 12 and the second member 13 before actuation of the SOWC 14 when switching into the first gear ratio, such as when changing the operating mode of the transmission 200 from a Neutral operating mode to a Drive operating mode. In the first gear ratio the clutch assembly 10 transmits torque through the SOWC 14 in a first rotational direction to provide drive torque capability without engine braking, allowing the vehicle to reduce speed by "coasting." Alternatively, the friction clutch 16 may be actuated in addition to the SOWC 14 to provide engine braking and drive torque in the first gear ratio. Shifting between the first gear ratio and the second gear ratio is preferably accomplished by actuation and release of the SOWC 14 without use of the friction clutch 16. In the second gear ratio the SOWC 14 is preferably still actuated and freewheeling. In the third gear ratio the friction clutch 16 transmits torque in a second rotational direction and the SOWC 14 is selectively engageable to provide coast braking in the first rotational direction. In the fourth gear ratio the SOWC 14 and the friction clutch 16 are not actuated and the clutch assembly 10 allows free rotation in the first rotational direction.

It should be appreciated that the clutch assembly 10 may be disposed in other transmissions having different configurations and gear ratios. For example the clutch 10 may be disposed in an eight forward speed ratio and one reverse speed ratio transmission, such as a transmission described in U.S. patent application Ser. No. 11,689 filed on Mar. 21, 2007, which is hereby incorporated by reference.

The present invention provides several beneficial operating modes while requiring a relatively small number of components. In addition, where a first gear ratio in a transmission requires a torque that is higher than the torque required in other gears, the friction clutch size may be reduced and the torque in the first gear ratio may be sustained by the SOWC instead of the friction clutch. The present invention provides these benefits with only two independently controllable hydraulic fluid actuators.

The description of the invention is merely exemplary in nature and variations that do not depart from the general essence of the invention are intended to be within the scope of the invention. Such variations are not to be regarded as a departure from the spirit and scope of the invention.

I claim:

1. A clutch assembly disposed in a vehicle transmission that has at least one planetary gear set, the clutch assembly comprising:
   a one-way clutch assembly connected between a first member of the at least one planetary gear set and a second member of the at least one planetary gear set, wherein the one-way clutch assembly is selectively actuatable, and wherein when the one-way clutch assembly transmits torque in a first rotational direction and allows rotation in a second rotational direction between the first member and the second member when the one-way clutch assembly is actuated; and
   a friction clutch disposed in parallel with the one-way clutch assembly, wherein the friction clutch includes at least one first friction element rotatably coupled to the first member and at least one second friction element rotatably coupled to the second member, and
   wherein the friction clutch and the one-way clutch assembly provide a plurality of operating conditions for operation of the transmission in a plurality of gear ratios.

2. The clutch assembly of claim 1, wherein the one-way clutch assembly is actuatable to transmit torque in a first gear ratio of the vehicle transmission.

3. The clutch assembly of claim 1, wherein the friction clutch has a torque rating that is less than a torque transmitted between the first member and the second member in a first gear ratio of the vehicle transmission.

4. The clutch assembly of claim 1, wherein the friction clutch is actuatable by a hydraulic fluid and the one-way clutch assembly is actuatable by a hydraulic fluid.

5. The clutch assembly of claim 1, wherein the at least one first friction element is a plurality of first friction elements and the at least one second friction element is a plurality of second friction elements.

6. The clutch assembly of claim 1, wherein the one-way clutch assembly includes a selectable one-way clutch having a first race rotatably coupled to the first member and a second race rotatably coupled to the second member.

7. The clutch assembly of claim 1, wherein the selectable one-way clutch includes a selector plate that is moveable between at least two positions to actuate the selectable one-way clutch.

8. A clutch assembly for transmitting a first torque between a first member and a second member, the clutch assembly comprising:
   a first clutch having at least one first clutch element rotatably coupled to the first member and at least one second clutch element rotatably coupled to the second member; and
   a selectable one-way clutch disposed in parallel with the first clutch between the first member and the second member, the selectable one-way clutch has an actuated state and a non-actuated state, wherein the selectable one-way clutch transmits torque between the first member and the second member in a first rotational direction and allows relative rotation between the first member and the second member in a second rotational direction when the selectable one-way clutch is in the actuated state, and wherein the selectable one-way clutch allows rotation in both the first rotational direction and the second rotational direction when the selectable one-way clutch is in the non-actuated state.

9. The clutch assembly of claim 8, wherein the first clutch is a friction clutch.

10. The clutch assembly of claim 9, wherein the first member is a first member of a planetary gear set and the second member is a second member of a planetary gear set.

11. The clutch assembly of claim 9, wherein the selectable one-way clutch assembly is configured to transmit torque in a first gear ratio of a vehicle transmission when the selectable one-way clutch is in the actuated state.

12. The clutch assembly of claim 8, wherein the first clutch has a torque rating that is less than a torque transmitted between the first member and the second member in a first gear ratio of the vehicle transmission.

13. The clutch assembly of claim 8, wherein the first clutch is actuatable by a hydraulic fluid and the one-way clutch assembly is actuatable by a hydraulic fluid.

14. A clutch assembly disposed in a vehicle transmission that has at least one planetary gear set, the clutch assembly comprising:
- a selectable one-way clutch connected between a first member of the at least one planetary gear set and a second member of the at least one planetary gear set, wherein when the one-way clutch assembly transmits torque in a first rotational direction and allows rotation in a second rotational direction between the first member and the second member when the one-way clutch assembly is actuated; and
- a friction clutch disposed in parallel with the selectable one-way clutch, wherein the friction clutch includes at least one first friction element rotatably coupled to the first member and at least one second friction element rotatably coupled to the second member, and wherein the friction clutch and the one-way clutch provide at least three operating conditions, wherein a first of the three operating conditions allows rotation in the first and second rotational directions between the first member and the second member, a second of the three operating conditions transmits torque in the first and the second rotational directions between the first member and the second member, and a third of the three operating conditions transmits torque in the first rotational direction and allows rotation in the second rotational direction between the first member and the second member.

15. The clutch assembly of claim 14, wherein the friction clutch has a torque rating that is less than a torque transmitted between the first member and the second member in a first gear ratio of the vehicle transmission.

16. The clutch assembly of claim 15, wherein the friction clutch includes a plurality of first friction elements and a plurality of second friction elements.

* * * * *